United States Patent [19]

Endemann et al.

[11] Patent Number: 4,823,351
[45] Date of Patent: Apr. 18, 1989

[54] DEVICE FOR FAST SWITCHING BETWEEN DIFFERENT WAVELENGTHS OF LASERS

[75] Inventors: Martin Endemann; Hansjuergen Hoeffgen, both of Frankfurt am Main, Fed. Rep. of Germany

[73] Assignee: Battelle-Institut e.V., Frankfurt am Main, Fed. Rep. of Germany

[21] Appl. No.: 6,561

[22] PCT Filed: Mar. 1, 1986

[86] PCT No.: PCT/EP86/00104
§ 371 Date: Sep. 4, 1986
§ 102(e) Date: Sep. 4, 1986

[87] PCT Pub. No.: WO86/05631
PCT Pub. Date: Sep. 25, 1986

[30] Foreign Application Priority Data
Mar. 12, 1985 [DE] Fed. Rep. of Germany ....... 3508707

[51] Int. Cl.$^4$ ............................................. H01S 3/10
[52] U.S. Cl. ............................ 372/20; 372/9; 372/98; 372/23; 372/15; 372/102
[58] Field of Search ............... 372/102, 92, 20, 15, 372/23, 98

[56] References Cited

U.S. PATENT DOCUMENTS

| | | | |
|---|---|---|---|
| 3,626,322 | 12/1971 | Tobias et al. | 372/19 |
| 3,725,817 | 4/1973 | Nolan | 372/15 |
| 3,753,148 | 8/1973 | Billman | 372/102 |
| 3,872,407 | 3/1975 | Hughes | 372/103 |
| 4,103,254 | 7/1978 | Chikami | 372/102 |
| 4,208,637 | 6/1980 | Matsuda et al. | 372/20 |
| 4,219,786 | 8/1980 | Chester | 372/102 |
| 4,241,318 | 12/1980 | Comera et al. | 372/23 |
| 4,425,648 | 1/1984 | Holly | 372/20 |
| 4,454,882 | 6/1984 | Takano | 372/14 |
| 4,479,220 | 10/1984 | Bor et al. | 372/102 |
| 4,601,036 | 7/1986 | Faxvog et al. | 372/102 |

FOREIGN PATENT DOCUMENTS

0118057 of 1984 Fed. Rep. of Germany.
3335317 of 1984 Fed. Rep. of Germany.
2245108 of 1975 France.

*Primary Examiner*—Léon Scott, Jr.
*Attorney, Agent, or Firm*—Fisher, Christen & Sabol

[57] ABSTRACT

For fast variation of the wavelengths of lasers, a rotating chopper mirror is provided in the laser resonator. This mirror alternately transmits the light to a grating or deflects it to at least a second grating or to a second mirror. Instead of a chopper mirror, an oscillating mirror can be used, by means of which the beam can be directed to a grating. The oscillating mirror is moved at constant frequency, but with variable amplitude.

8 Claims, 1 Drawing Sheet

DEVICE FOR FAST SWITCHING BETWEEN DIFFERENT WAVELENGTHS OF LASERS

BACKGROUND OF THE INVENTION

1. Field of the Invention

The invention relates to a device for the fast variation of the wavelength of lasers, provided with a movable mirror arrangement in the optical path of the laser resonator, by means of which the beam can be directed to a grating, the desired wavelength being adjustable by varying the angle of incidence of the light on the grating.

2. Description of the Prior Art

Lasers permitting fast tuning between two wavelengths are being used in a wide variety of applications, e.g. for the remote measurement of pollutants by means of pulsed lasers using the differential absorption technique. The spacing of the laser pulses of the two different wavelengths should range between one and ten milliseconds.

For fast tuning, it is known to use a grating which rotates in the resonator of a pulsed laser at constant angular velocity. In the course of one rotation period, the grating passes through all possible angular positions which determine the emission frequency of the laser. The desired laser frequency can thus be adjusted by triggering the laser exactly at the time when the angular position of the rotating grating is correct. This ensures full liberty to select the laser frequency at each laser pulse. In the case of rapidly pulsed lasers, the frequency of successive pulses can be arbitrarily determined. Instead of a rotating grating, a rotating mirror or a rotating polygonal mirror is frequently used to direct the beam to the grating. A scan mirror oscillating at constant amplitude can have the same function.

In the case of pulse repetition frequencies of about 100 to 1000 pulses per second, rather high rotational velocities of the grating or of the reflecting mirror result. Consequently the time of laser triggering has to be observed with very narrow tolerances, typically about 0.1 microseconds. This accuracy necessitates sophisticated control equipment and involves major technological problems in particular in the case of pulsed $CO_2$ lasers; these problems may reduce the tuning accuracy and slightly vary the direction of the emitted beam.

SUMMARY OF THE INVENTION

The object of the present invention is to provide an easily realizable device which permits fast switching between different wavelengths without affecting the tuning accuracy or the beam adjustment.

According to the invention, this object is reached by alternately deflecting the light by means of a rotating chopper mirror, to the grating or at least to a second grating or at least to a second mirror. According to another embodiment, an oscillating mirror is provided which is driven at constant frequency, but with variable amplitude. The subclaims reciting variations in the rotating or oscillating mirror relate to preferred embodiments of the device according to the invention.

According to the invention, there are two possibilities of avoiding the drawbacks of the known devices for fast tuning. The first embodiment of a simple tuning device consists, for example, of a rotating chopper mirror which alternately transmits and deflects the laser beam in the optical resonator. The two resultant resonator arms contain tuning elements such as gratings, which can individually be adjusted to different wavelengths. As the chopper mirror merely interrupts or reflects the laser beam, there are no critical tolerances for the triggering the laser in this case, either.

The chopper mirror as such may consist of several segments, in order thus to reduce the required rotational velocity. At a desired tuning frequency of, e.g., 1000 Hertz and a chopper mirror with five segments and a corresponding number of cuts, the required rotational frequency of the mirror is 6000 rpm. This rotational velocity can be reached without any difficulties. Appropriate balancing permits vibration-free running, so that this tuning device does not affect the other components of the laser resonator.

The second embodiment consists in an oscillating mirror to which the beam is directed such that the desired wavelengths are adjusted when the mirror is at the reversal points. This requires deflection of the beam by the oscillating mirror driven at constant frequency, but with variable amplitude. Control of the amplitude can be effected without any major difficulties. As the oscillating mirror moves only slowly at the reversal points, this device provides for marked reduction of the necessary accuracy of the triggering point to values between 10 and 100 microseconds. Such an accuracy can also be reached without any major effort with pulsed $CO_2$ lasers.

BRIEF DESCRIPTION OF THE DRAWINGS

The invention is explained in more detail on the basis of the schematic drawing.

DETAILED DESCRIPTION OF THE INVENTION

The following description refers to the drawings.

Figure 1:
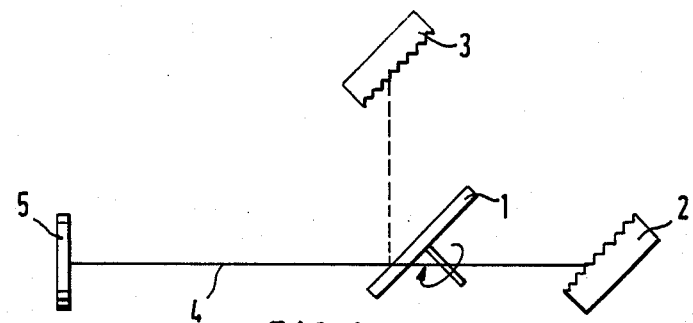
FIG. 1 shows a device with a chopper mirror and two gratings.

In the embodiment according to FIG. 1, a chopper mirror 1 rotating in the direction of the arrow, which in this case has the shape of an impeller wheel, is incorporated in the laser resonator. The angle at which the mirror 1 is fixed can be arbitrarily selected. Two gratings 2 and 3 are provided relative to the mirror 1.

If no reflecting area is in the beam path 4, the optical resonator is formed by the mirror 1, the grating 2 and the laser end mirror 5. If a mirror segment is in the beam path 4, the optical resonator is formed by the mirror 1 and the grating 3. Both grating 2 and grating 3 can be replaced by a control mirror, which deflects the light to the then available grating 2 or 3.

Figure 2:
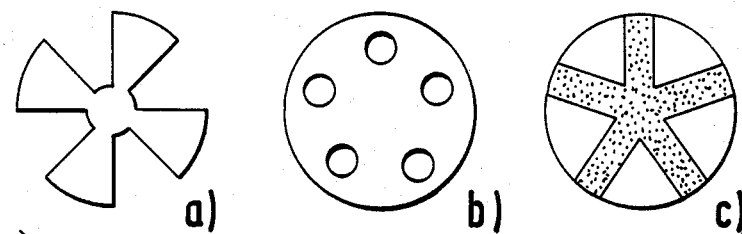
FIG. 2 shows several embodiments of the chopper mirror.

The chopper mirror can be implemented in different ways. Some embodiments are illustrated in FIG. 2. It is possible, for example, to cut pieces out of a round mirror such that an impeller wheel or a fan with flat blades is obtained (FIG. 2 a). By providing holes, e.g. by drilling, it is also possible to produce a chopper mirror (FIG. 2 b). A transparent substrate can be made reflecting in certain places (FIG. 2 c). Furthermore, it is possible to fix mirror segments on a chopper disk. In the latter case, mirror segments can be fixed on the chopper disk at different angles, so that the light is incident on the repective grating at different angles. The chopper mirror can also be produced directly as metal mirror, e.g. of copper or aluminium. The number of cuts or mirror segments can be adapted to the particular application.

Figure 3:
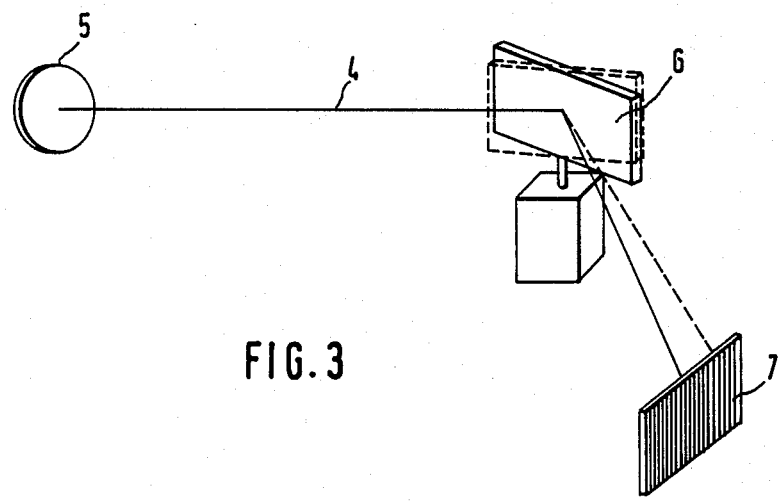
FIG. 3 shows the mode of operation of the oscillating mirror.

If an oscillating mirror 6, as shown in FIG. 3, is used, it is placed in the optical path in such a way that the light is incident on the grating (7) at different angles.

We claim:

1. In a tunable pulsed laser, having an optical resonator and a device comprising a first and a second reflecting means defined by an output end mirror of said laser and a reflective dispersing means which permits the selection of wavelengths for the laser beam, said device for fast switching of different wavelengths of said laser comprising a rotatable chopper mirror (1) located on the optical axis (4) of said resonator, with rotating means to rotate said chopper mirror about said optical axis and at an acute angle to said optical axis so that the light is directed alternately between at least two optical paths defined by
(a) a first reflecting means comprising said laser output end mirror (5) and said dispersive reflecting means (2), and
(b) a reflective surface of said chopper mirror (1) and at least a second dispersive reflective means (3) so as to permit the rapid alternating selection of at least two wavelengths for the laser beam.

2. A device as claimed in claim 1 wherein the mirror (1) is provided in the form of a fan with flat blades, a perforated disk or a transparent substrate which is made reflecting in certain places.

3. A device as claimed in claim 2 wherein the blades of the fan-like mirror (1) are inclined.

4. A device as claimed in claim 2 or 3 for pulsed lasers wherein the spacing between mirror segments in the mirror (1) is selected according to the desired pulse repetition frequency of said laser to minimize the rotational velocity of the mirror.

5. A device as claimed in claim 1 wherein at least one of said dispersive reflective means ((2) and (3)) are diffraction gratings.

6. A device as claimed in claim 1 wherein the light is deflected from said reflective surface of said chopper mirror (1) to said at least one dispersive reflecting means (3) via at least one control mirror.

7. In a tunable pulsed laser having an optical resonator and a device defined by an output end mirror (5) of said laser and a first diffraction grating (2) which permits the selection of the wavelength for the laser beam, said device for the fast switching of the different wavelengths of said laser comprising a rotatable chopper mirror (1) having a plurality of reflective segments fixed on said chopper mirror at different angles and located on the optical axis (4) of said resonator, with rotating means to rotate said chopper mirror about said optical axis and at an acute angle to said optical axis so that the light is directed alternately between the two optical paths defined by:
(a) said laser output end mirror and said first diffraction grating, and
(b) a reflective surface of said chopper mirror and a second diffraction grating (3) so as to permit the rapid alternating selection of at least two wavelengths for the laser beam, wherein the spacing between mirror segments in the mirror (1) is selected according to the desired pulse repetition frequency of said laser to minimize the rotational velocity of the mirror.

8. In a tunable pulsed laser having an optical resonator and a device comprising a first and a second reflecting means defined by an output end mirror of said laser and a reflective dispersing means which permits the selection of the wavelengths for the laser beams, said device for fast switching of different wavelengths of said laser comprising a rotatable segmented chopper mirror (1) having a plurality of segments and located on the optical axis (4) of said resonator, with rotating means to rotate said chopper mirror about said optical axis and at an acute angle to said optical axis so that the light is directed alternately between at least two optical paths defined by
(a) a first reflection means comprising said laser output end mirror (5) and said dispersive reflecting means (2),
(b) a segmented reflective surface of said chopper mirror (1) and
(c) at least a second dispersive reflective means (3), so as to permit the rapid alternating selection of at least two wavelengths for the laser beam,
wherein the spacing between mirror segments in the mirror (1) is selected according to the desired pulse repetition frequency of said laser to minimize the rotational velocity of the mirror.

* * * * *